Figure 1:
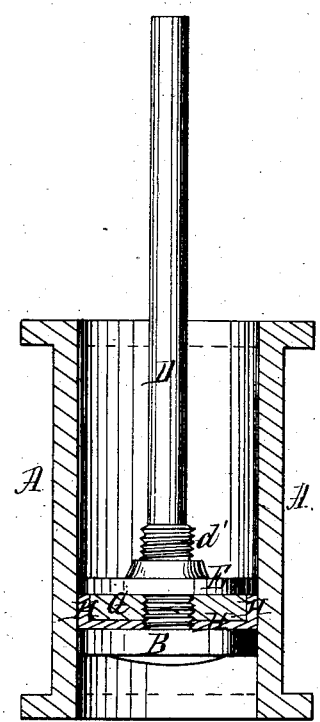
Figure 2:
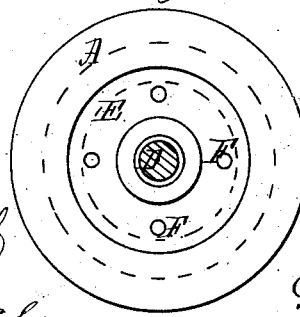

D. B. Fuller,
Pump Packing,
No. 45,989. Patented Jan. 24, 1865.

Witnesses:
W. H. Forbush
Geo. M. Wallace

Inventor:
Dwight B. Fuller

UNITED STATES PATENT OFFICE.

DWIGHT B. FULLER, OF BUFFALO, NEW YORK.

IMPROVEMENT IN PISTON-PACKING FOR PUMPS.

Specification forming part of Letters Patent No. 45,989, dated January 24, 1865.

*To all whom it may concern:*

Be it known that I, DWIGHT B. FULLER, of the city of Buffalo, county of Erie, and State of New York, have invented a certain new and Improved Pump-Packing; and I do hereby declare that the following is a full, clear, and exact description thereof, reference being had to the accompanying drawings and the letters of reference marked thereon, in which—

Figure I is a longitudinal section of a cylinder and piston provided with my improved packing, and Fig. II is a plan of same.

Letters of like name and kind refer to like parts in each of the figures.

A represents the cylinder, within which the piston works.

B represents the piston-head, secured to the piston-rod D.

E represents a follower, which screws onto the piston-rod D, as represented, a screw-thread, $d'$, being cut on the piston-rod for that purpose. A number of holes, F, are made in the follower, into which a wrench may be inserted to screw down the follower.

G represents a flat disk, of india-rubber or similar elastic material, placed upon the piston-rod between the follower E and piston-head B. The diameter of this disk is slightly less than that of the cylinder.

H represents a leather bonnet, crimped into the cup-like form shown. This bonnet fits over the rubber disk G, and forms a covering to it, which moves in contact with the cylinder.

By screwing down the follower the rubber disk is compressed in thickness and expanded in diameter, which expansion forces the leather bonnet into close contact with the cylinder, and forms a perfectly air and water tight packing. As the bonnet wears by use, it is simply necessary to screw down the follower to renew the contact of the bonnet with the cylinder and render it again effectively air and water tight.

This packing is particularly applicable to pumps working under a heavy pressure, in which the nature of the gas or fluid acted upon is such as not to impair the elasticity of the rubber disk. It is believed that it is simpler in construction, and will remain effectively tight longer under heavy pressure than any other packing at present in use.

The leather bonnet H, being drawn over the rubber disk, protects the disk from friction, and for that reason the disk will retain its elasticity unimpaired, and will remain for any length of time, ready to exert its expansive power against the bonnet and hold it in close contact with the cylinder. Hence this bonnet is the only part of the packing liable to wear, and its combination with the rubber disk and follower enables me to use that for a great length of time, and until it is entirely worn out, and when worn out a new one can be put in its place at a small expense, and thereby the packing is made as good as new. A perfectly air and water tight packing is thereby at all times secured against the natural wear of that part which comes in contact with the cylinder, and at a much less expense and greater economy in practical operation than any other packing now in use.

Having thus described my invention, what I claim as new, and desire to secure by Letters Patent, is—

The combination of the follower E, elastic disk G, and leather bonnet H, for the purposes and substantially as described.

DWIGHT B. FULLER.

Witnesses:
GEO. W. WALLACE,
W. H. FORBUSH.